(12) United States Patent
Aksit et al.

(10) Patent No.: US 6,648,333 B2
(45) Date of Patent: Nov. 18, 2003

(54) METHOD OF FORMING AND INSTALLING A SEAL

(75) Inventors: Mahmut Faruk Aksit, Istanbul (TR); Ahmad Safi, Troy, NY (US); Abdul-Azeez Mohammed-Fakir, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/028,927

(22) Filed: Dec. 28, 2001

(65) Prior Publication Data

US 2003/0122311 A1 Jul. 3, 2003

(51) Int. Cl.[7] .................................. F16J 15/02
(52) U.S. Cl. ....................... 277/316; 277/647; 277/652; 277/931; 415/174.2
(58) Field of Search .................. 277/316, 647, 277/650, 652, 924, 925, 931; 415/174.2

(56) References Cited

U.S. PATENT DOCUMENTS

| | | | | |
|---|---|---|---|---|
| 3,893,786 A | * | 7/1975 | Rahnke et al. ............... 415/178 |
| 4,199,151 A | * | 4/1980 | Bartos ......................... 277/306 |
| 4,336,943 A | * | 6/1982 | Chaplin ....................... 277/643 |
| 4,477,086 A | * | 10/1984 | Feder et al. ................. 277/632 |
| 4,589,666 A | * | 5/1986 | Halling ........................ 277/631 |
| 4,602,795 A | * | 7/1986 | Lillibridge .................. 277/644 |
| 5,158,305 A | * | 10/1992 | Halling ........................ 277/591 |
| 5,716,052 A | * | 2/1998 | Swensen et al. ............ 277/647 |
| 5,819,854 A | * | 10/1998 | Doane et al. ............... 166/373 |
| 6,164,656 A | * | 12/2000 | Frost ........................... 277/312 |

* cited by examiner

*Primary Examiner*—Anthony Knight
*Assistant Examiner*—Alison K. Pickard
(74) *Attorney, Agent, or Firm*—Nixon & Vanderhye

(57) ABSTRACT

In a gas turbine including a nozzle retaining ring having a first annular axially facing sealing surface and a shroud segment having an axial registering second surface. To minimize or prevent leakage flow between the retaining ring and shroud segments, a generally U-shaped seal having reversely folded U-shaped marginal portions is received in a cavity formed in the second surface. At operating conditions, the marginal portions seal against the base of the cavity and the first surface of the retaining ring to prevent leakage flow past the retaining ring/shroud segment interface. To install the seal, the seal body is first compressed and maintained in a compressed state by applying one or more wraps about the seal body and an epoxy is used to secure the seal when compressed in the cavity. At operating temperatures, the retention means releases the seal to engage marginal portions against opposite sealing surfaces of the shroud segments and retaining ring.

14 Claims, 6 Drawing Sheets

METHOD OF FORMING AND INSTALLING A SEAL

BACKGROUND OF THE INVENTION

The present invention relates to resilient seals in turbines and particularly to methods of compressing a seal and retaining the compressed seal in a restrained condition as well as to methods for installing and releasing the seal in situ to seal against adjacent turbine parts.

In a gas turbine, hot gases of combustion flow from combustors through nozzles and buckets of the various turbine stages. Compressor discharge air is typically used to cool certain of the turbine elements. It will be appreciated that there is a need for seals at various locations in the turbine, as well as different types of seals. In co-pending U.S. patent application Ser. No. 10/028,928, filed Dec. 28, 2001 (Attorney Docket No. 839-1127) and Ser. No. 10/029,003, filed Dec. 28, 2001 (Attorney Docket No. 839-1124), there is disclosed a similar seal for use at two different locations within the turbine. For example, one of the disclosed seals may be used for sealing between the nozzle segments and a nozzle support ring to provide a seal supplemental to the chordal hinge seals sealing against leakage flow from the high pressure compressor discharge region into the lower pressure hot gas path. Another similar seal may be utilized for sealing between the nozzle retaining ring and shroud segments. Leakage paths or gaps sometimes appear between these sealing systems during turbine operations. In these and other sealing sites in a turbine, it is therefore desirable that seals be deployed between these sealing surfaces. Seal installation between these close-fitting sealing surfaces is difficult and it has been found desirable to compress the seals prior to and during installation to avoid damage to the seals and/or ancillary structure. Accordingly, there is a need for a seal which can be restrained in a compressed condition prior to and during installation and forms an effective seal under turbine operation conditions as well as for methods of installing and relieving the restrained seal for use.

BRIEF DESCRIPTION OF THE INVENTION

In accordance with a preferred embodiment of the present invention, there is provided a resilient seal having sealing portions laterally spaced from one another and restrained in reduced lateral dimension prior to and during installation of the seal into the turbine. Subsequent to closure of the seal within sealing surfaces of the turbine parts, an operating condition of the turbine relieves or releases the restrained (compressed) seal, enabling the sealing surfaces to resiliently engage the adjacent sealing surfaces of the turbine parts to form the seal. In a particular preferred embodiment, the seal includes an elongated seal body having a generally U-shaped body portion in cross-section and a pair of reversely extending, generally U-shaped marginal portions in cross-section along opposite sides and at distal ends of the U-shaped body portion. In a preferred form, the seal is formed of sheet metal, preferably a pair of complementary-shaped sheet metal plates secured to one another in back-to-back relation and formed into the aforementioned configuration. Prior to installation, the seal is placed in a resiliently compressed or restrained state and maintained in that compressed state during installation. That is, the lateral sealing surfaces of the seal body are displaced toward one another and resiliently restrained in that condition prior to installation of the seal into the turbine to reduce the lateral extent of the seal. In that manner, the seal can be installed into a seal cavity on one of the turbine parts without any portion of the seal projecting from the seal cavity, enabling the assembly of the turbine parts without interference between the seal and the turbine parts.

To compress and maintain the seal in a compressed condition in accordance with a preferred embodiment hereof, the seal body is passed longitudinally between a pair of laterally spaced side-by-side rollers. The rollers displace the seal portions, e.g., the U-shaped marginal portions, toward one another to reduce the lateral extent of the seal. The compressed seal is then passed through a rotating bobbin holder ring which mounts a bobbin on its periphery for rotation about the elongated seal. As the compressed seal passes through the rotating bobbin holder ring, the fiber from the bobbin is wrapped about the compressed seal, maintaining the seal in its compressed condition. The bobbin holder ring may be alternately rotated about the seal in opposite directions to provide alternate clockwise and counterclockwise wrapping of the fiber about the seal. By wrapping the fiber in opposite directions, torsional effects on the seal due to the compressed wrapping are nullified.

The fibers are preferably formed of a material which will disintegrate at a turbine operating condition. Specifically, the fibers may be formed of carbon or a Kevlar® material known as Kevlar® 29. These carbon or Kevlar® fibers will disintegrate as the turbine heats up, releasing the seal from its compressed installation condition to an operable condition with the marginal sealing surfaces expanding to engage against sealing surfaces of the turbine parts, forming an effective seal. Preferably, the wrapped seal may be adhesively secured within the seal cavity to ensure that it resides completely within the cavity and does not fall out of the cavity during installation. At or below turbine operating temperatures, the epoxy and restraining fibers burn up and release the seal without leaving significant residue.

In a preferred embodiment according to the present invention, there is provided in a turbine having parts including a pair of adjacent surfaces and a flexible seal in sealing engagement with the adjacent surfaces, the seal having a pair of sealing portions preloaded to sealingly engage the pair of adjacent surfaces, respectively, upon installation of the seal into the turbine, a method of installing the flexible seal in the turbine, comprising the steps of locating the seal between the adjacent surfaces, maintaining the seal between the adjacent surfaces with the sealing portions thereof in a first position poised and biased for movement into sealing engagement with the adjacent surfaces and releasing the sealing portions of the seal in situ for movement from the first position into a second position in sealing engagement with the respective adjacent surfaces in response to a turbine operating condition.

In a further preferred embodiment according to the present invention, there is provided for a turbine having parts including a pair of adjacent surfaces and a flexible seal for sealing between the adjacent surfaces, the seal having a generally U-shaped body portion and a pair of sealing surfaces laterally spaced from one another along opposite sides of the U-shaped body portion, a method of forming the flexible seal for installation of the seal in the turbine, comprising the steps of resiliently displacing the sealing surfaces of the seal toward one another in a generally lateral direction into a turbine installation condition to reduce lateral spacing between the sealing surfaces relative to one another and preload the sealing surfaces for movement away from one another into a sealing condition, retaining the sealing surfaces in the installation condition while installing the seal between the pair of adjacent turbine surfaces and enabling the sealing surfaces for resilient movement away from one another into the sealing condition engaging and sealing against the adjacent surfaces of the turbine subsequent to closure of the sealing surfaces about the seal.

DETAILED DESCRIPTION OF THE INVENTION

Figure 1:
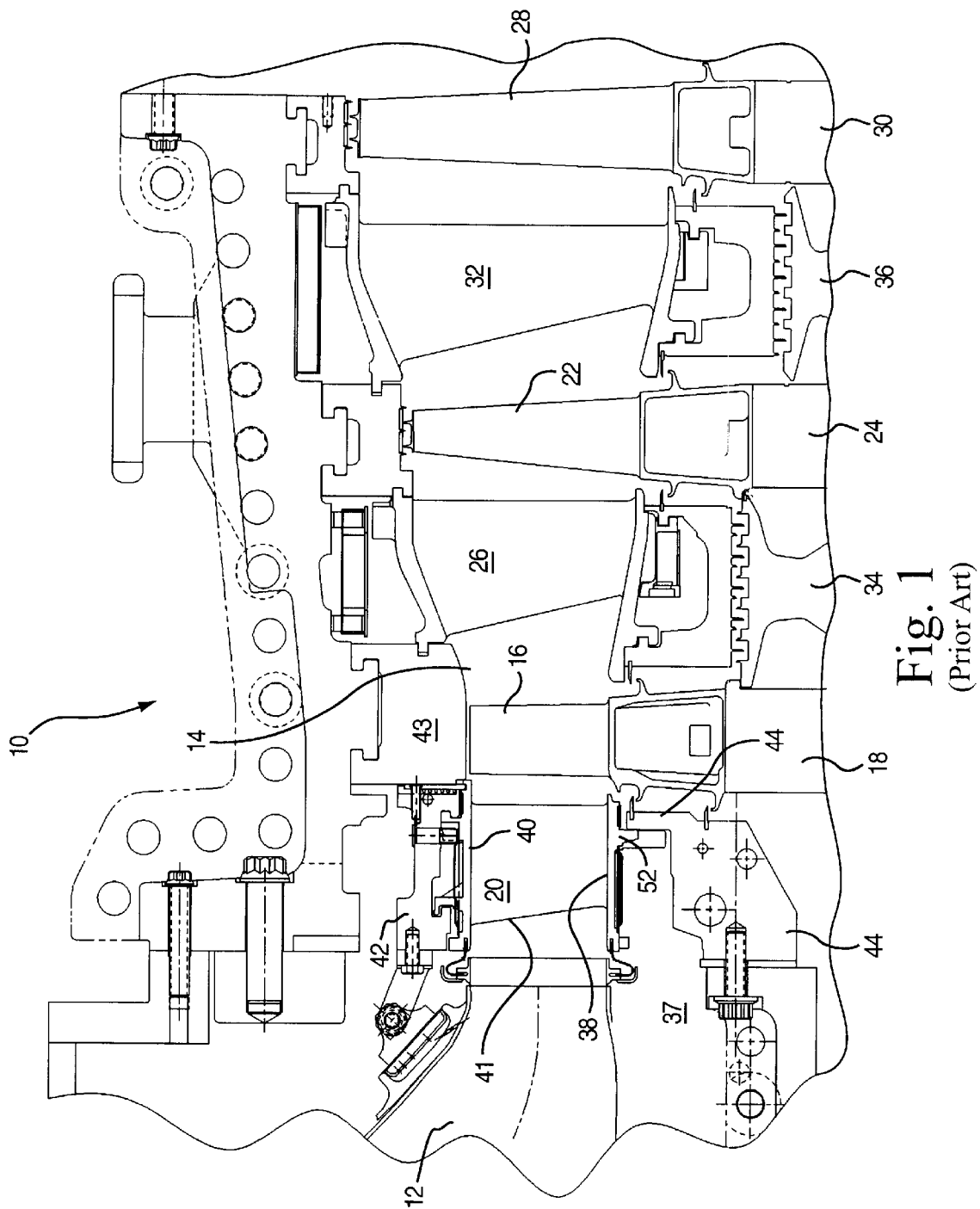
FIG. 1 is a fragmentary schematic side elevational view of a portion of a gas turbine in which seals constructed in accordance with a preferred embodiment hereof may be utilized.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41, each mounting one, preferably two, stator vanes extending between inner and outer band portions and arranged in an annular array of segments. A nozzle retaining ring 42 connected to the turbine casing is coupled to the outer band and secures the first-stage nozzle. Shroud segments 43 arranged in an annular array thereof surround the rotatable buckets, e.g., the buckets 16 of the first stage. The shroud segments include an axial facing surface 46 (FIG. 2) which lies in sealing engagement with a confronting axial facing surface 48 of the nozzle retaining ring 42. A nozzle support ring 44 (FIG. 1) radially inwardly of the inner band 38 of the first-stage nozzles engages the inner band 38, particularly the inner rail 52 thereof.

As noted previously, however, in turbine operation, the nozzle retaining ring 42 and the shroud segments 43 may tend to form leakage gaps between the axially confronting sealing surfaces 46 and 48 whereby leakage flow may occur across such gaps. In order to minimize or prevent such leakage flow into the hot gas path 14, and, as described and illustrated, in co-pending U.S. patent application Ser. No. 10/028,928, filed Dec. 28, 2001 (Attorney Docket 839-1127), there is provided a seal for sealing between the nozzle retaining ring 42 and the shroud segments 43. It will be appreciated that a similar seal may be employed to seal between various other parts of a turbine, e.g., the inner rail 52 and the nozzle supporting ring 44, e.g., as set forth in U.S. patent application Ser. No. 10/029,003, filed Dec. 28, 2001 (Attorney Docket No. 839-1124). A representative example of such seal, generally designated 70 (FIG. 2), includes a seal body 71 having a first, generally U-shaped portion 72 in cross-section and a pair of reversely extending, generally U-shaped marginal sealing portions 74 in cross-section along opposite sides of the U-shaped portion 72. Preferably, the seal body 71 is formed of sheet metal. In a particular embodiment hereof, a pair of sheet metal plates 76 and 78 are secured in back-to-back relation to one another, for example, by welding, to form the seal body 71.

Figure 2:
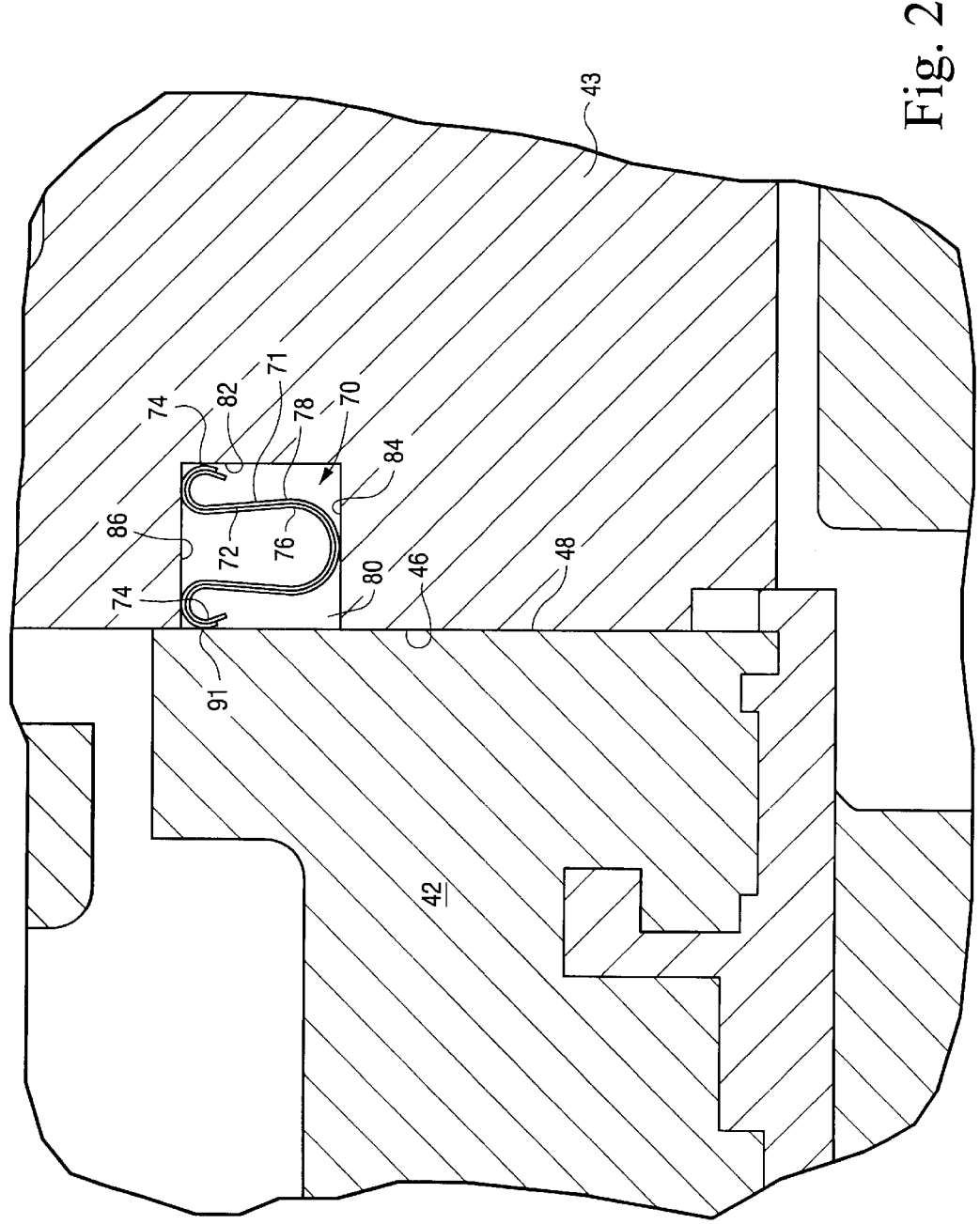
FIG. 2 is a representative example of a seal constructed in accordance with a preferred embodiment of the present invention interposed between a nozzle segment retaining ring and a shroud segment.

Still referring to FIG. 2, one of the sealing surfaces 46 and 48 of the shroud segments 43 and the nozzle retaining ring 44 is provided with a cavity 80 for housing the seal 70. Preferably, the cavity 80 is formed in the shroud segments 43 with the cavity 80 opening generally axially through surface 46 and toward the axially opposite sealing surface 48 of the nozzle retaining ring 44. The cavity 80 includes a base 82 and radially opposed surfaces 84 and 86, respectively. The cavity 80 extends in an arcuate path about the axis of the turbine rotor and lies radially outwardly of the hot gas path 14. It will also be appreciated that the seal 70 is provided preferably in arcuate lengths in excess of the arcuate length of the individual shroud segments, preferably in 90° or 180° lengths, and therefore spans the joints between the shroud segments. Consequently, the seal 70 is located to substantially preclude any leakage flow past the axially opposed surfaces 46 and 48.

Figure 3:
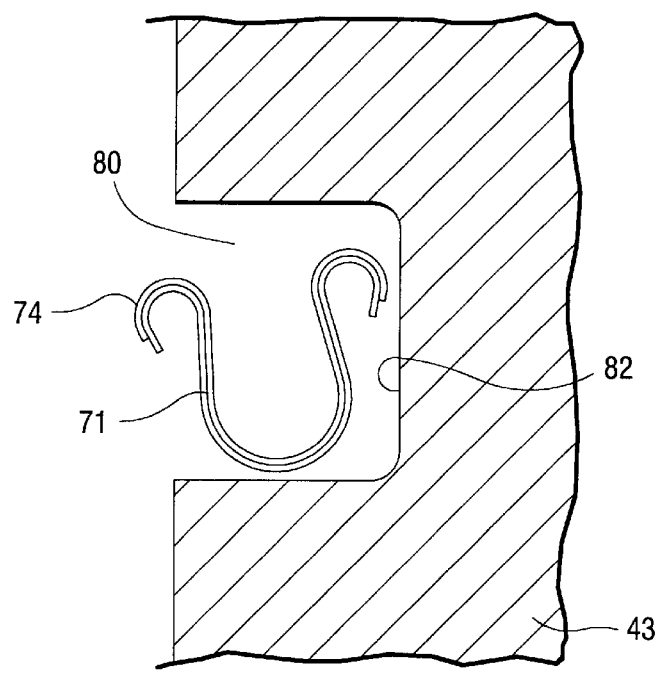
FIG. 3 is a schematic representation of the seal of FIG. 2 in a natural state having a lateral dimension larger than the depth of the seal cavity, causing interference between adjacent sealing parts upon installation of the seal.

In a natural state of the seal body as illustrated in FIG. 3 and in its sealing state illustrated in FIG. 2, the laterally outer extremities of the marginal U-shaped portions 74 extend outwardly beyond the lateral extent of the main U-shaped portion 72. Also, in the natural state of seal body 71 illustrated in FIG. 3, the marginal sealing portions 74 extend laterally in excess of the depth of cavity 80. This lateral dimension inhibits or precludes assembly of the turbine paths having the sealed surfaces, e.g., surfaces 46 and 48, due to potential interference of those parts with the protruding seal body 71. For example, the projecting marginal portion 74 may snag on the retaining ring 42 or snap off entirely upon installation of the mating parts, e.g., surfaces 46 and 48. This, of course, could render the seal ineffective during turbine operation.

Because the marginal sealing portions 74 are biased or preloaded for sealing engagement against the respective base surface 82 of cavity 80 and the sealing surface 48 in use, and also to avoid interference between the seal and sealing parts during assembly of the seal, the seal 70 must first be compressed during installation. Otherwise, and with references to FIG. 3, a marginal portion 74 will project from the cavity 80 when the seal body 71 is initially placed in the cavity.

Figure 4:
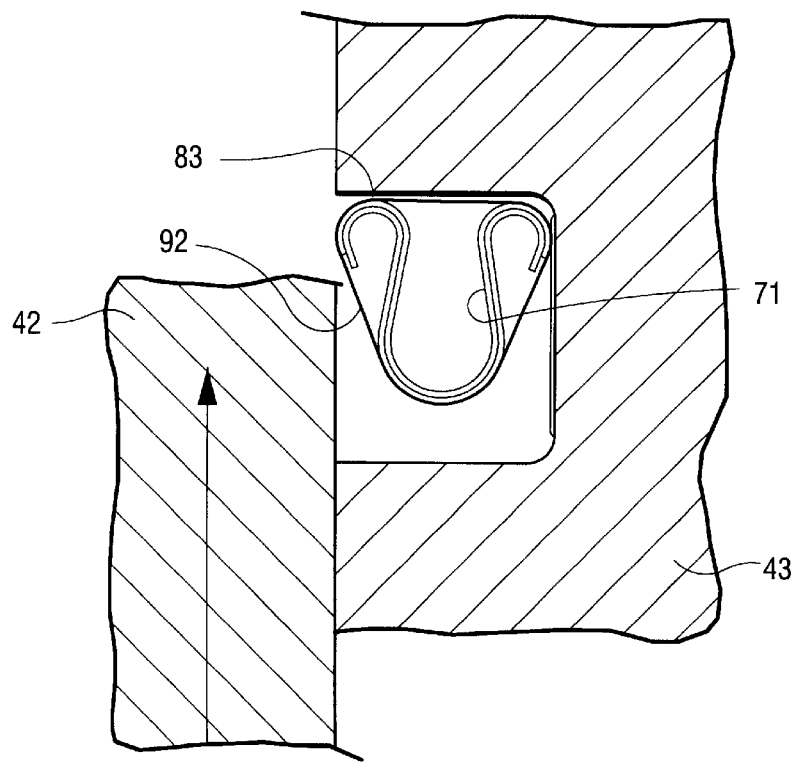
FIG. 4 is a schematic representation of a seal compressed for installation in accordance with the present invention.
Figure 5:
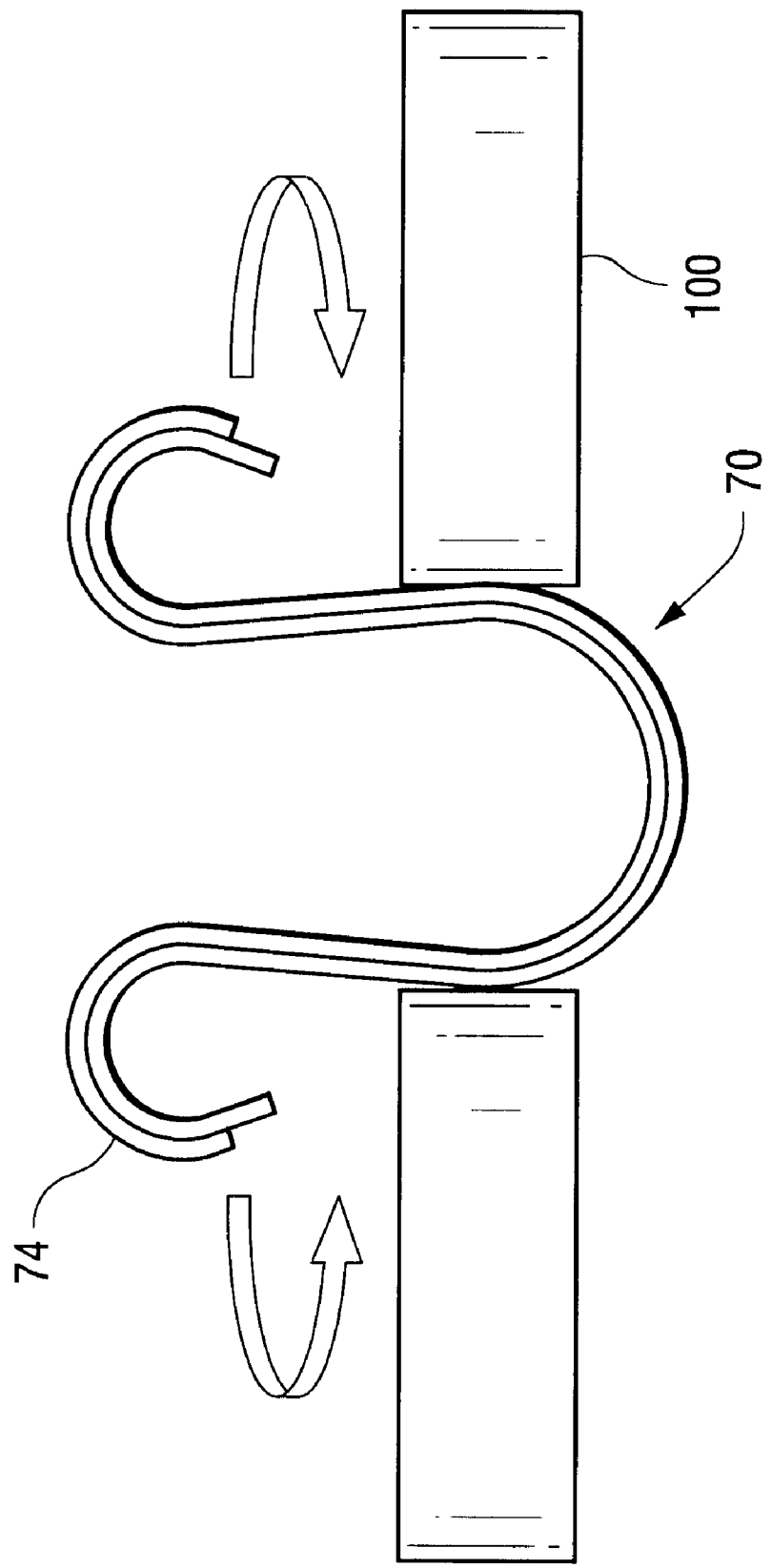
FIG. 5 is an enlarged end view of the seal prior to installation and illustrating the process of compressing the seal between a pair of rollers.

To install the seal body 71, the body is first compressed to a configuration which, when inserted into the cavity 80, enables the seal body to lie wholly within the confines of the cavity 80 as illustrated in FIG. 4. That is, the lateral dimension between the marginal sealing portions 74 is reduced (FIG. 4) to a dimension equal to or less than the lateral dimension between the base surface 82 and the sealing surface 48. Means are provided to maintain the seal body in such compressed state during installation. Such means, for example, may comprise a wrap 92 provided about the entire length or portions of the length of each seal segment. The wrap restrains the marginal seal portions 74 of the seal in the compressed condition of the seal with the lateral extent of the marginal seal portions 74 reduced. Such wrap may comprise Kevlar® 29 and may comprise a continuous wrap or a segmented wrap about sections of the seal. Alternatively, a high-strength plastic such as Lexan™ or Ultem™ clips may hold the seal 70 in a compressed state during assembly.

Figure 6:
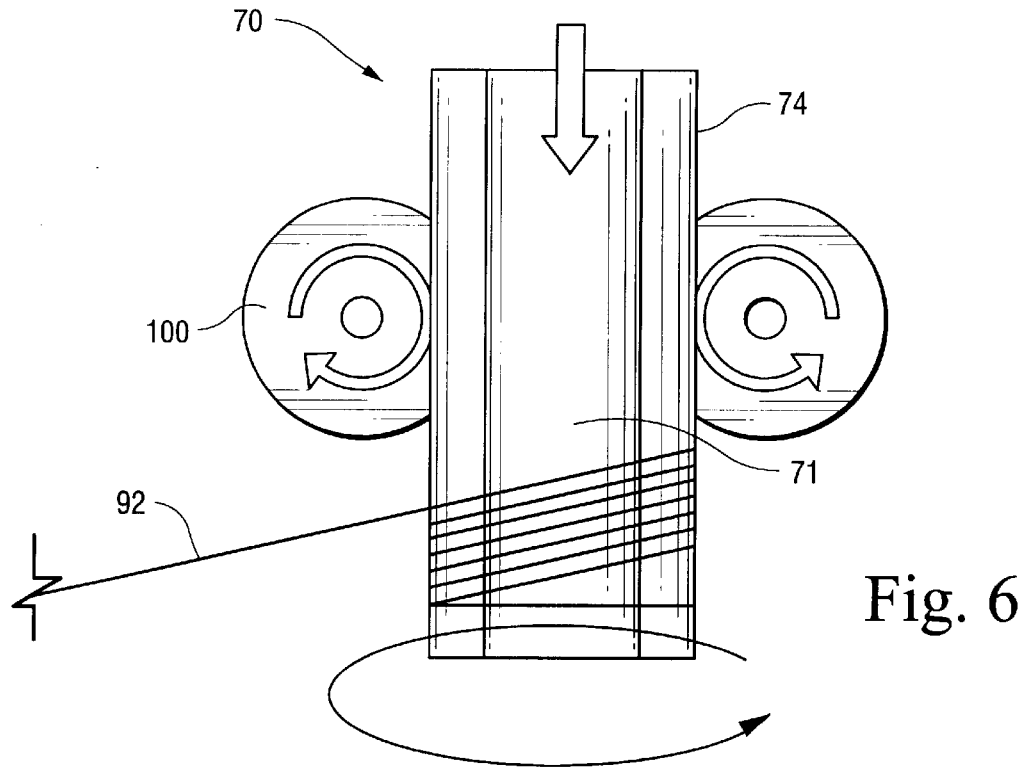
FIG. 6 is a plan view of the compressed seal being wrapped by a fiber.

Referring now to FIGS. 5–8, the seal 70 is wrapped in a compressed state with a wrap 92 as indicated previously such that, upon assembly, the seal 70 may reside completely within the cavity 80. To compress the seal, the elongated seal 70 is advanced through a pair of compression rollers 100, the spacing between which can be adjusted to adjust the degree of lateral compression of the seal. Thus, when the seal 70 passes through the rollers 100, the lateral margins 74 of seal 70 are displaced laterally toward one another, reducing the overall lateral dimension of the seal. The rollers 100 thus induce a bias or preload on the seal in its compressed condition. As illustrated in FIG. 6, the rollers 100 feed the elongated seal 70 through a wrapping mechanism by which the wrap 92 is wound about the seal 70 to maintain the seal under compression and reduced in lateral dimension.

Figure 7:
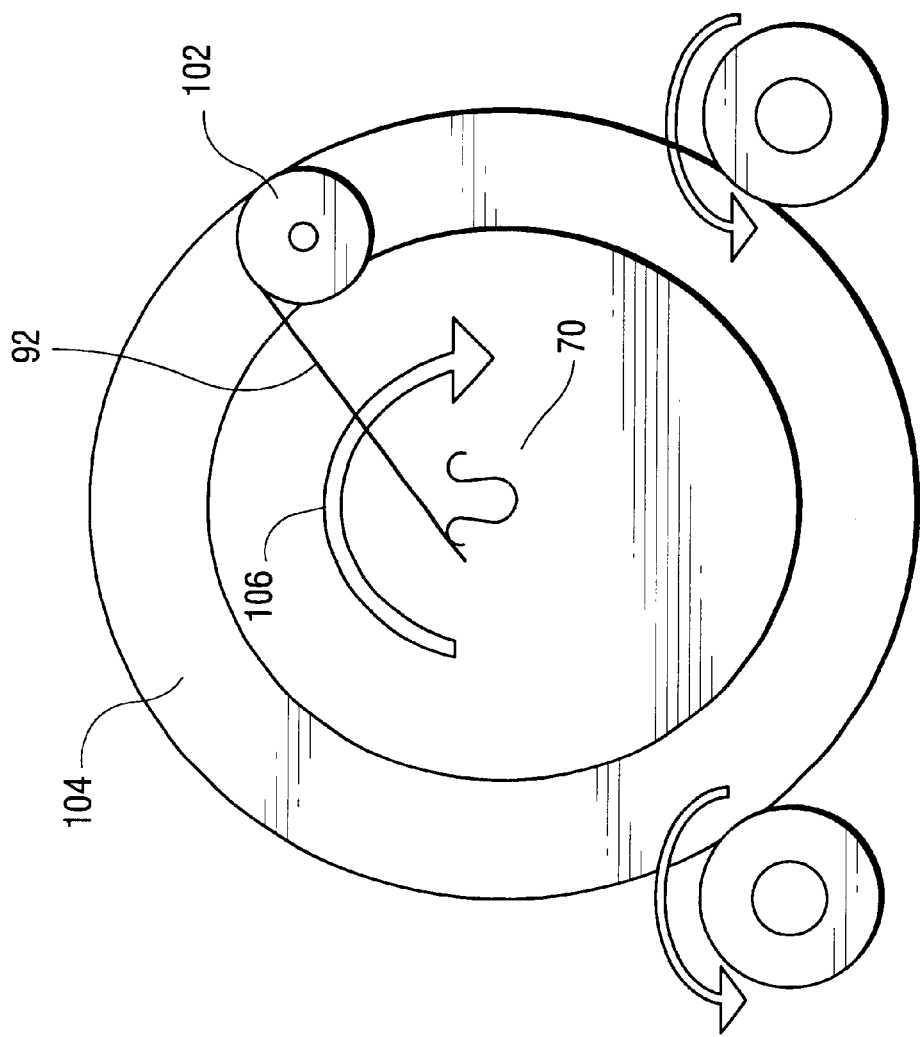
FIG. 7 is a schematic representation of a bobbin ring mounting a bobbin for wrapping the seal with fiber.

Referring to FIG. 7, the wrapping mechanism includes a bobbin 102 mounted on a rotatable ring 104. The bobbin carries the wrap 92 and the ring is rotatable in opposite directions, one of the rotary directions being illustrated by the arrow 106 in FIG. 7. The ring 104 is rotated by powered gears or friction rollers, not shown, which are equipped with a direction reversal mechanism. Consequently, as the seal 70 passes through the ring 104 and the ring is rotated, the fiber 92 is wrapped about the compressed seal 70 in one direction. By reversing the rotational direction of the ring 104, the wrap may be disposed about the seal body 71 in a reverse direction. For example, alternate wraps in clockwise and counterclockwise directions may be provided. By providing for reversal of the wrap about the ring, torsional effects due to the compressed wrapping are completely eliminated. The seal 70 thus emerges from the wrapping mechanism in a restrained compressed condition, as illustrated in FIG. 8.

Figure 8:
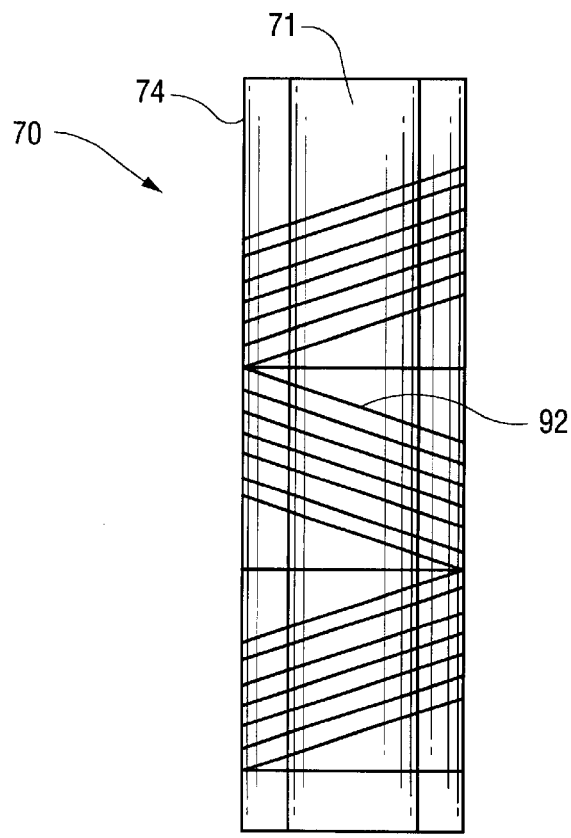
FIG. 8 is a plan view of a wrapped seal with the fibers extending both clockwise and counterclockwise directions about the seal.

With the seal 70 wrapped as illustrated in FIG. 8 and reduced in lateral dimension, the seal can be located wholly within the sealing groove, for example, groove 80, of the shroud segments. Epoxy 83 (FIG. 4) may be applied to the margins of the seal to maintain the seal in the cavity during installation.

As the turbine reaches operating conditions, e.g., high operating temperatures, the retaining means, e.g., the wrap or wraps, release the seal from its compressed state, enabling the seal to expand under natural bias or preload in a lateral (axial) direction. Where epoxy is used to retain the compressed seal in the cavity, the operating conditions, e.g., high operating temperatures, similarly cause the epoxy to melt and release the seal. Such expansion of the seal body 71 locates surface portions 91 (FIG. 2) of the marginal portions 74 into engagement against the base 82 of the cavity 80 and the sealing surface 48 of the nozzle retaining ring 42. Consequently, the marginal portions 74 of the seal remain biased or preloaded into sealing engagement with the opposed sealing surfaces notwithstanding relative movement of the surfaces 46 and 48 or the opening of one or more leakage gaps therebetween. It will be appreciated that a metal-to-metal line contact with good sealing performance is thus provided by the seal 70 to prevent any leakage flow past the confronting axial surfaces 46 and 48.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a turbine having parts including a pair of adjacent surfaces and a flexible seal in sealing engagement with said adjacent surfaces, said seal having a pair of sealing portions preloaded to sealingly engage said pair of adjacent surfaces, respectively, upon installation of the seal into the turbine, a method of installing the flexible seal in the turbine, comprising the steps of:

locating the seal between said adjacent surfaces;

maintaining the seal between said adjacent surfaces with said sealing portions thereof in a first position poised and biased for movement into sealing engagement with said adjacent surfaces, at least one of said sealing portions in said first position being spaced from one of said adjacent surfaces; and releasing the sealing portions of said seal in situ for movement in response to said bias from said first position into a second position in sealing engagement with said respective adjacent surfaces in response to a turbine operating condition.

2. A method according to claim 1 wherein the sealing portions of the seal are released in response to temperature conditions at said seal between a turbine startup temperature and a turbine operating temperature.

3. A method according to claim 1 including displacing the sealing portions of said seal in situ under the influence of the seal preload.

4. In a turbine having parts including a pair of adjacent surfaces and a flexible seal in sealing engagement with said adjacent surfaces, said seal having a pair of sealing portions preloaded to sealingly engage said pair of adjacent surfaces, respectively, upon installation of the seal into the turbine, a method of installing the flexible seal in the turbine, comprising the steps of:

locating the seal between said adjacent surfaces;

maintaining the seal between said adjacent surfaces with said sealing portions thereof in a first position poised and biased for movement into sealing engagement with said adjacent surfaces;

releasing the sealing portions of said seal in situ for movement from said first position into a second position in sealing engagement with said respective adjacent surfaces in response to a turbine operating condition; and wrapping the seal with a restraint prior to locating the seal between the adjacent surfaces to maintain the sealing portions in said first position thereof, and causing disintegration of the restraint in situ at a turbine temperature between startup temperature and operating temperature to release the sealing portions for movement into sealing engagement with said adjacent surfaces.

5. In a turbine having parts including a pair of adjacent surfaces and a flexible seal in sealing engagement with said adjacent surfaces, said seal having a pair of sealing portions preloaded to sealingly engage said pair of adjacent surfaces, respectively, upon installation of the seal into the turbine, a method of installing the flexible seal in the turbine, comprising the steps of:

locating the seal between said adjacent surfaces;

maintaining the seal between said adjacent surfaces with said sealing portions thereof in a first position poised and biased for movement into sealing engagement with said adjacent surfaces;

releasing the sealing portions of said seal in situ for movement from said first position into a second position in sealing engagement with said respective adjacent surfaces in response to a turbine operating condition; and forming a cavity in one of said surfaces and locating the seal and the sealing portions thereof wholly within the cavity.

6. In a turbine having parts including a pair of adjacent surfaces and a flexible seal in sealing engagement with said adjacent surfaces, said seal having a pair of sealing portions preloaded to sealingly engage said pair of adjacent surfaces, respectively, upon installation of the seal into the turbine, a method of installing the flexible seal in the turbine, comprising the steps of:

locating the seal between said adjacent surfaces;

maintaining the seal between said adjacent surfaces with said sealing portions thereof in a first position poised and biased for movement into sealing engagement with said adjacent surfaces;

releasing the sealing portions of said seal in situ for movement from said first position into a second position in sealing engagement with said respective adjacent surfaces in response to a turbine operating condition; and the seal being elongated and including wrapping the seal with a fiber along the length of the seal.

7. In a turbine having parts including a pair of adjacent surfaces and a flexible seal in sealing engagement with said adjacent surfaces, said seal having a pair of sealing portions preloaded to sealingly engage said pair of adjacent surfaces, respectively, upon installation of the seal into the turbine, a method of installing the flexible seal in the turbine, comprising the steps of:

locating the seal between said adjacent surfaces;

maintaining the seal between said adjacent surfaces with said sealing portions thereof in a first position poised and biased for movement into sealing engagement with said adjacent surfaces;

releasing the sealing portions of said seal in situ for movement from said first position into a second position in sealing engagement with said respective adjacent surfaces in response to a turbine operating condition; and the seal being elongated and including wrapping the seal with a fiber in alternate clockwise and counterclockwise directions about the seal at discrete longitudinal locations therealong.

8. In a turbine having parts including a pair of adjacent surfaces and a flexible seal in sealing engagement with said adjacent surfaces, said seal having a pair of sealing portions preloaded to sealingly engage said pair of adjacent surfaces, respectively, upon installation of the seal into the turbine, a method of installing the flexible seal in the turbine, comprising the steps of:

locating the seal between said adjacent surfaces;

maintaining the seal between said adjacent surfaces with said sealing portions thereof in a first position poised and biased for movement into sealing engagement with said adjacent surfaces;

releasing the sealing portions of said seal in situ for movement from said first position into a second position in sealing engagement with said respective adjacent surfaces in response to a turbine operating condition; and said seal including a first generally U-shaped portion with said pair of sealing portions including a pair of reversely extending, generally U-shaped marginal sealing portions in cross-section along opposite edges of said U-shaped portion, and including wrapping the seal with a restraint to reduce a lateral dimension between said marginal sealing portions and preload the seal.

9. For a turbine having parts including a pair of adjacent surfaces and a flexible seal for sealing between the adjacent surfaces, said seal having a generally U-shaped body portion and a pair of sealing surfaces laterally spaced from one another along opposite sides of the U-shaped body portion, a method of forming said flexible seal for installation of the seal in the turbine, comprising the steps of:

resiliently displacing the sealing surfaces of the seal toward one another in a generally lateral direction into a turbine installation condition to reduce lateral spacing between said sealing surfaces relative to one another and preload the sealing surfaces for movement away from one another into a sealing condition;

installing the seal between the pair of adjacent turbine surfaces while retaining said sealing surfaces in said installation condition with at least one of said sealing surfaces spaced from one of said adjacent surfaces; and enabling the sealing surfaces for resilient movement away from one another into the sealing condition engaging and sealing against the adjacent surfaces of the turbine subsequent to closure of the adjacent surfaces about the seal.

10. A method according to claim 9 including releasing the sealing surfaces from said installation condition in response to a temperature condition within the turbine for movement into the sealing condition.

11. For a turbine having parts including a pair of adjacent surfaces and a flexible seal for sealing between the adjacent surfaces, said seal having a generally U-shaped body portion and a pair of sealing surfaces laterally spaced from one another along opposite sides of the U-shaped body portion, a method of forming said flexible seal for installation of the seal in the turbine, comprising the steps of:

resiliently displacing the sealing surfaces of the seal toward one another in a generally lateral direction into a turbine installation condition to reduce lateral spacing between said sealing surfaces relative to one another and preload the sealing surfaces for movement away from one another into a sealing condition;

retaining said sealing surfaces in said installation condition while installing the seal between the pair of adjacent turbine surfaces;

enabling the sealing surfaces for resilient movement away from one another into the sealing condition engaging and sealing against the adjacent surfaces of the turbine subsequent to closure of the adjacent surfaces about the seal; and wrapping the seal with a restraint prior to installing the seal between the adjacent surfaces to retain the seal in said installation condition.

12. For a turbine having parts including a pair of adjacent surfaces and a flexible seal for sealing between the adjacent surfaces, said seal having a generally U-shaped body portion and a pair of sealing surfaces laterally spaced from one another along opposite sides of the U-shaped body portion, a method of forming said flexible seal for installation of the seal in the turbine, comprising the steps of:

resiliently displacing the sealing surfaces of the seal toward one another in a generally lateral direction into a turbine installation condition to reduce lateral spacing between said sealing surfaces relative to one another and preload the sealing surfaces for movement away from one another into a sealing condition;

retaining said sealing surfaces in said installation condition while installing the seal between the pair of adjacent turbine surfaces;

enabling the sealing surfaces for resilient movement away from one another into the sealing condition engaging and sealing against the adjacent surfaces of the turbine subsequent to closure of the adjacent surfaces about the seal; and the seal is being elongated and including wrapping the seal with a fiber along the length of the seal.

13. For a turbine having parts including a pair of adjacent surfaces and a flexible seal for sealing between the adjacent surfaces, said seal having a generally U-shaped body portion and a pair of sealing surfaces laterally spaced from one another along opposite sides of the U-shaped body portion, a method of forming said flexible seal for installation of the seal in the turbine, comprising the steps of:

resiliently displacing the sealing surfaces of the seal toward one another in a generally lateral direction into a turbine installation condition to reduce lateral spacing between said sealing surfaces relative to one another and preload the sealing surfaces for movement away from one another into a sealing condition;

retaining said sealing surfaces in said installation condition while installing the seal between the pair of adjacent turbine surfaces;

enabling the sealing surfaces for resilient movement away from one another into the sealing condition engaging and sealing against the adjacent surfaces of the turbine subsequent to closure of the adjacent surfaces about the seal; and the seal being elongated and including wrapping the seal with a fiber in alternate clockwise and counterclockwise directions about the seal at discrete longitudinal locations therealong.

14. For a turbine having parts including a pair of adjacent surfaces and a flexible seal for sealing between the adjacent surfaces, said seal having a generally U-shaped body portion and a pair of sealing surfaces laterally spaced from one another along opposite sides of the U-shaped body portion, a method of forming said flexible seal for installation of the seal in the turbine, comprising the steps of:

resiliently displacing the sealing surfaces of the seal toward one another in a generally lateral direction into a turbine installation condition to reduce lateral spacing between said sealing surfaces relative to one another and preload the sealing surfaces for movement away from one another into a sealing condition;

retaining said sealing surfaces in said installation condition while installing the seal between the pair of adjacent turbine surfaces;

enabling the sealing surfaces for resilient movement away from one another into the sealing condition engaging and sealing against the adjacent surfaces of the turbine subsequent to closure of the adjacent surfaces about the seal; and said seal including a first generally U-shaped portion with said pair of sealing portions including a pair of reversely extending, generally U-shaped marginal sealing portions in cross-section along opposite edges of said U-shaped portion, and including wrapping the seal with a restraint to reduce a lateral dimension between said marginal sealing portions and preload the seal.

* * * * *